June 26, 1956  T. B. GUSDANOVIC  2,751,704
ARTIFICIAL PLUG BAIT
Filed Nov. 22, 1952
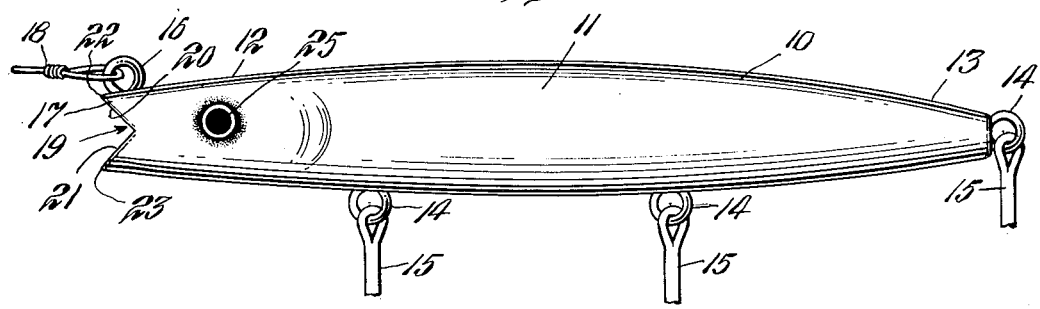
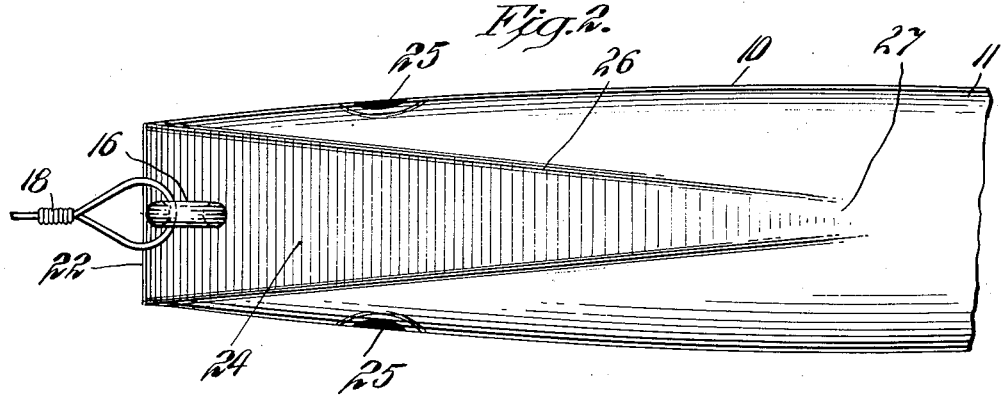
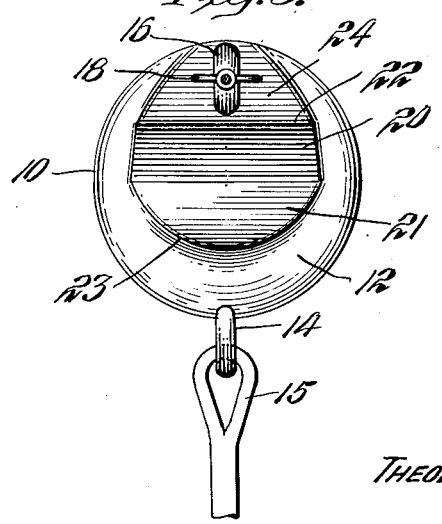
INVENTOR.
THEODORE B. GUSDANOVIC
BY *Howard T. Thompson*
ATTORNEY

United States Patent Office 2,751,704
Patented June 26, 1956

2,751,704

ARTIFICIAL PLUG BAIT

Theodore B. Gusdanovic, Brooklyn, N. Y.

Application November 22, 1952, Serial No. 322,043

1 Claim. (Cl. 43—42.48)

This invention relates to artificial baits, generally referred to as plugs or lures. More particularly, the invention deals with a product of this kind having a novel head and mouth structure to control movement or action of the plug or lure in the water and, by reason of these structures and action resulting therefrom, produces a plug or lure attractive to fish and, accordingly, meeting satisfaction of the fishermen.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a side view of a plug made according to my invention, with parts of the construction broken away.

Fig. 2 is an enlarged top plan view of the head end portion of the plug; and

Fig. 3 is a front view of the plug, as seen in Fig. 2.

In the drawing, I have shown at 10 an artificial bait, commonly referred to as a plug, or lure, the same comprising an elongated tapered body having a relatively large central portion 11, a head end 12 and a tail end 13. The length of the body is more than five times greater than the diameter of the large central portion of said body. Coupled with the lower surface and end 13 of the plug body are a series of conventional eyes 14, with which conventional hooks or groups of hooks 15 are coupled, the shank portions only of the hooks being shown, as these hooks are well-known and form no part of the present invention.

At 16 I have shown fixed to the upper lip portion 17 of the head another eye, with which a leader or line can be coupled, part of the leader or line being indicated at 18. At 19 I have shown what may be termed a V-shaped mouth arranged centrally with respect to the head 12. The mouth 19 is defined by an upper lip surface 20 and a lower lip surface 21, these surfaces being substantially at 90° to each other. The upper edge 22 of the lip surface 20 is horizontally straight, as will clearly appear from a consideration of Figs. 2 and 3; whereas, the edge 23 of the lower lip surface 21 is rounded, as clearly noted in Fig. 3, the latter conforming to the round contour of the lower portion of the head 12 of the plug.

The upper surface of the head 12 is transversely flat and longitudinally curved to a slight extent, as seen at 24, and this flat surface tapers backwardly and gradually fades into the body of the central portion of the plug in straight converging side edges 26, as will clearly appear from a consideration of Fig. 2 of the drawing. The plug may be suitably characterized in any desired manner for purposes of attraction. For example, I have indicated at 25 representations of eyes at the sides of the head 12.

It will be understood that the body portion of the plug or lure may be constructed of any suitable material and weighted sufficiently to provide the desired casting effects, keeping in mind that plugs or lures of this type and kind are quite often utilized in what is termed surf-casting.

Here it is also to be kept in mind that weight factor has to deal with winds which may prevail, so that the plug or lure can be cast out a reasonably long distance from the shore or from the position assumed on the shore by the fishermen. In connection with the latter, it will be understood that surf-casters quite often utilize high boots so as to be able to stand in the shallow water along the shore, thus enabling them to cast out as far as possible into the surf.

With my improved head and mouth construction, I provide a plug or lure which offers resistance to retrieving which is particularly desirable in the surf when the tide has a tendency to move the plug or lure toward shore.

While referring to a weighted lure, it will be understood that this weight factor is applied to what is generally referred to as a floating-type of lure so that, together with the structure of the head, the lure can assume a position slightly below the surface of the water in the operation of being retrieved. On the other hand, the floating characteristics of the lure will maintain the lure above the bottom, this preventing snagging with obstacles at the bottom of the sea or other water bed where fishing is being conducted.

In addition to the foregoing advantages, my improved lure, by virtue of the structure of the head and mouth and also by virtue of coupling the leader with an eye 16 above the upper lip, the lure performs a back and forth darting action in the water, with or in combination with an intermittent diving action as a lure is being retrieved and depending upon the degree or speed of the retrieving operation. In this connection, the reference to "darting" may also be characterized as "swimming" and, in this respect, the lure symbolizes normal small fish action in the water, which has proven to result in great success in the use of the lure in catching fish as compared with results attained by use of my other types of known lures in the same conditions and at the same time.

It is thus quite apparent that it is not a question of the coloring, marking or size of the lure, but rather in the position of the lure in the water, its retarded action during retrieving and its darting or swimming action which renders the lure attractive to fish, resulting in success in catching fish where other well-known and long used lures apparently were unattractive and unsuccessful in performing the desired results.

Considering Fig. 2 of the drawing, it will appear that the converging sides 26 of the flat 24, at their inner extremities, are spaced from each other at 27 and merge into the surface of the central portion 11 of the plug. Further, as noted in Fig. 1 of the drawing, the body of the lure or plug is longitudinally curved, at its top and bottom, and these curvatures are substantially uniform from the head end to the tail end.

Having fully described my invention, what I claim as new and desire to secure by Letters Patent is:

A fishing lure, comprising an elongated body having outwardly contracted ends joined by a large diameter central portion, one end constituting the tail of the body, the other constituting the head end, the head end being defined by a round lower surface and a transversely flat rearwardly contracted upper surface extending to said central portion, the sides of the upper flat surface being substantially straight and converging longitudinally of the body to said central portion, said sides, at their inner extremities, being spaced from each other and merging into the surface of the central portion, the outer end of the head terminating centrally in a mouth having angularly disposed upper and lower lips, the surfaces of said lips being disposed at substantially 90° to each other, the upper lip joining said upper flat surface in a straight edge, and a leader eye being positioned centrally of the forward end of said upper flat surface, the length of said body being materially greater than the diameter of said central portion, said body being longitudinally curved at the top and bottom, and the longitudinal curvature of the top and bottom being each substantially uniform from the head end to the tail end.

References Cited in the file of this patent

UNITED STATES PATENTS

| | | | |
|---|---|---|---|
| D. 54,071 | Dills | Nov. 4, | 1919 |
| D. 168,507 | Heiner | Dec. 30, | 1952 |
| 1,786,568 | Kutz | Dec. 30, | 1930 |
| 2,215,772 | Vecchia | Sept. 24, | 1940 |
| 2,506,263 | Bessinger | May 2, | 1950 |
| 2,641,862 | Poe | June 16, | 1953 |